United States Patent [19]

Hall et al.

[11] Patent Number: 5,063,473
[45] Date of Patent: Nov. 5, 1991

[54] MODULAR ELECTRICAL SERVICE DISTRIBUTION SYSTEM

[75] Inventors: James R. Hall, Dracut, Mass.; Lorin E. Hunter; Terry D. Wilson, both of Roswell, Ga.

[73] Assignee: AT&T Bell Laboratories, Murray Hill, N.J.

[21] Appl. No.: 431,792

[22] Filed: Nov. 6, 1989

[51] Int. Cl.⁵ .............................................. H02G 3/28
[52] U.S. Cl. .................................... 361/93; 361/102; 174/68.3; 439/210; 439/211
[58] Field of Search ............... 361/378, 426, 428, 102, 361/56, 101, 111; 174/68.3, 101; 439/207, 210, 201

[56] References Cited

U.S. PATENT DOCUMENTS

| | | | |
|---|---|---|---|
| 2,119,782 | 6/1938 | Fullman | 439/207 |
| 2,610,996 | 9/1952 | Rickabaugh | 439/201 |
| 3,263,131 | 7/1966 | Rowe | 361/378 |
| 3,541,224 | 3/1969 | Joly | 174/68.3 |
| 3,636,984 | 1/1972 | Rauhauser | 174/101 |
| 4,166,195 | 8/1979 | Schwab | 174/101 |

Primary Examiner—A. D. Pellinen
Assistant Examiner—C. S. Schultz
Attorney, Agent, or Firm—Thomas Stafford

[57] ABSTRACT

An electrical distribution system for factories and offices is assembled from prewired modules. The basic module comprises a section of duct of a standard length with electrical feeder wires mounted therein. The wires are bared of insulation at one end and have connectors at the other to receive the insulation-free wire ends of an adjacent module. Some modules may also include prewired branch circuits with circuit breakers and outlets in a variety of configurations.

6 Claims, 5 Drawing Sheets

MODULAR ELECTRICAL SERVICE DISTRIBUTION SYSTEM

FIELD OF THE INVENTION

Inside electrical service distribution, particularly industrial service.

BACKGROUND OF THE INVENTION

In the not too distant past, factories and office buildings have been designed to suit their single purpose without substantial change for twenty or more years. The market, however, has not allowed such long lived arrangements. Factories and offices must be rearranged to suit new products, tenants and personnel on a much more frequent basis. In the manufacture of high-technology electronic equipment, for example, it has been estimated that the average length of time a piece of manufacturing equipment remains in one place is approximately eighteen months. The cost of making the necessary changes, however, can be extremely high. A significant contributor is the cost of providing necessary service at the new location, i.e., electricity, data communications, air, etc. Often, to meet electrical codes, new ducts and service distribution centers have to be installed, new wires pulled in, and the equipment hard-wired in place, all by skilled craft persons.

An object of the invention is a flexible supply system that is easily installed and changed with a small amount of semi-skilled labor.

SUMMARY OF THE INVENTION

The heart of the flexible system of the invention is a pre-assembled electrical power service module comprising a duct section of a predetermined standard length, and electrical feeder wires mounted within and extending the length of the duct section. The wiring is free of insulation at one end and has connectors at the other end for receiving the insulation-free ends of the wires of an adjacent module to provide a continuous electrical power service line. The modules may include pre-wired branch circuits with circuit breakers and outlets of a standard or custom mix. Rearrangements may therefore involve simply plugging the equipment into a pre-existing outlet accessible to the new location, replacing modules or parts of modules, or even extending the service by installing modules in new locations. The modules may be installed with simple hand tools such as a screwdriver or allen wrench, and still meet applicable electrical codes. Service of several different voltages, single and three-phase, regulated and unregulated circuits, can be supplied by the same module.

DETAILED DESCRIPTION

Figure 1:
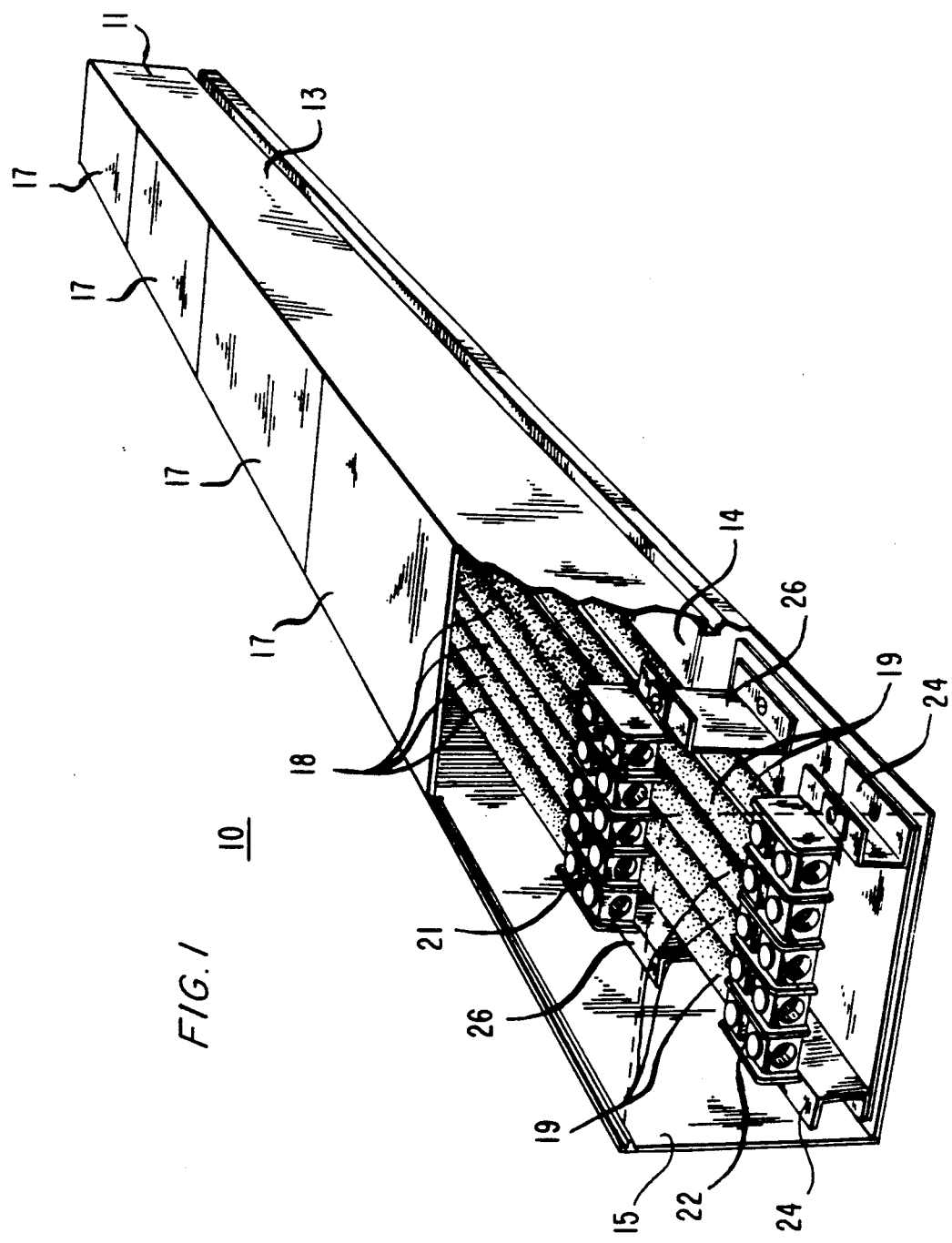
FIG. 1 is a pictorial drawing of an embodiment of the invention.

In the embodiment of the invention shown in FIG. 1, an electric service module 10, according to the invention, includes a section of duct 11, which may have three contiguous walls 13, 14, and 15. The fourth wall, providing closure, may for convenience be made up of several removable shorter length covers 17. Inside duct section 11, two tiers of feeder wires 18 and 19 of substantially the same length as duct section 11 may be terminated in block connectors 21 and 22, respectively. Connectors 22 are rigidly fastened to and spaced a short distance from duct wall 14 by a pair of stand-off brackets 24, 24. Connectors 21 are rigidly mounted on a higher pair of brackets, 26, 26, to provide clearance from the first tier of wires 19. Brackets 26, 26 are also connected to duct wall 14. Thus, as shown in FIG. 1, connectors 22 include a first plurality of wire connectors in a first tier and connectors 21 include a second plurality of wire connectors in a second tier positioned above and horizontally displaced relative to the first tier of connectors 22.

Since factory and office buildings generally use a substantial amount of electrical power, feeder wires 18 and 19 may often be of substantial size, such as number 2 gauge.

Figure 3:
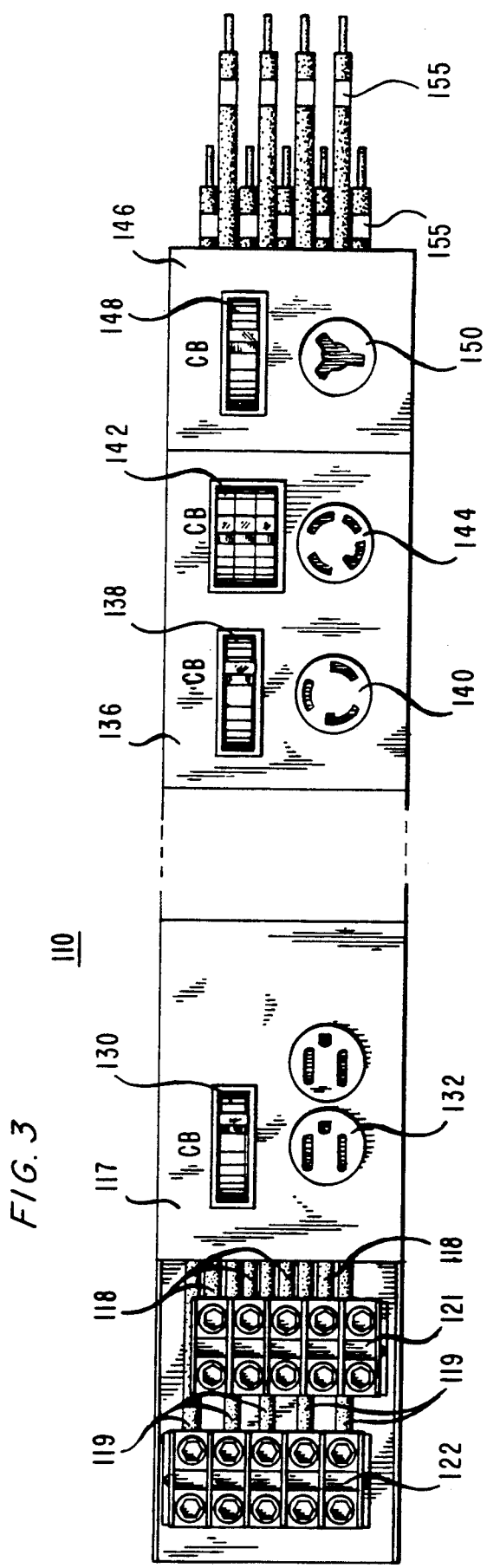
FIGS. 3 and 4 are pictorial drawings illustrating features of the invention.

At the other end of module 10, not visible in FIG. 1, and shown in FIG. 3, all of the feeder wires are bared of insulation and labeled for identification, ready to be inserted into connectors 21 and 22 of an adjacent module. Connectors 21 and 22, of course, must be of a type approved by applicable codes for factory and office installations. The type illustrated in FIG. 1, which uses allen screws to form the electrical and mechanical connections, is one of several approved connectors that may be used to practice the invention.

Figure 2:
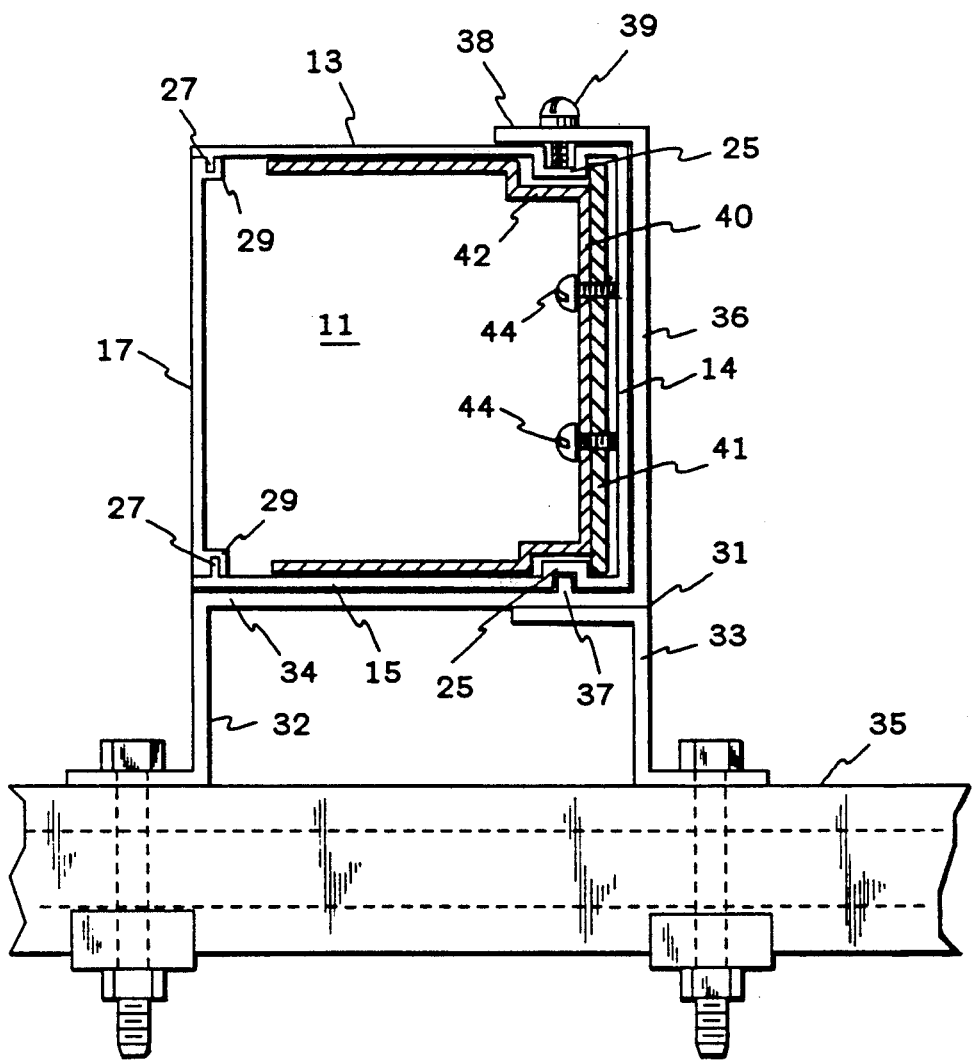
FIG. 2 is a cross-section of a duct in the embodiment of FIG. 1.

To further facilitate the ease of assembly that is a major advantage of the invention, easy mounting of the duct itself is very helpful. One easily mounted duct system, available from Airey Thompson Inc., of Los Angeles, Calif. is illustrated in the cross section drawing of FIG. 2. In this system, duct 11 is a three walled extrusion with a channel 25 in each of opposing walls 13 and 15, near connecting wall 14. A protruding ridge 27 at the free edges of walls 13 and 15 cooperates with a channel 29 formed on the edges of cover plate 17 to allow the covers to snap in place for secure retention, yet snap out for easy access.

A mounting bracket 31 comprises a pair of feet 32, 33 for bolting onto a support member 35, which may be part of a grid suspended from the building frame for supporting the service installation. Foot 32 is extended into a u-shaped cradle for duct 11, having a bottom section 34, a back section 36 and a top section 38. A protruding ridge 37 on bottom section 34 of bracket 31 fits into channel 25 of duct wall 15, and a screw 39 threaded through the top section 38 enters channel 25 of duct wall 13 to secure the duct section to the bracket.

A semi-skilled worker can easily mount the duct section, or a service module, including the duct section, according to the invention, onto a previously installed set of brackets by inserting ridge 37 into channel 25 and tightening screw 39. Bracket 31 is flexible enough to allow this insertion.

Finally, a duct section connector 40 comprises a flat plate 41 welded to a modified u-channel plate 42. Four screws 44 are threaded through connector 40. Connector 40 is inserted into an adjacent duct section, with flat plate 41 entering the space between channels 25 and wall 14. Tightening screws 44 against duct wall 14 of each duct section locks the two duct sections together.

I have thus described a prewired electrical service module that is quickly installed and connected with simple hand tools. With the addition of L-sections and T-sections based on the same principles having wire connectors at one end and connector-ready wire ends at the other, electrical service can be distributed throughout the plant.

To make the service available to the machinery, branch circuits and outlets are needed. In the typical factory wiring arrangement of the prior art, the heavy gauge feeder wires are pulled through the feed ducts into distribution boxes. Individual branch circuits are split off and protected by switches and fuses or circuit breakers located within a distribution box. Lighter gauge branch wires, fed through smaller branch ducts, connect the branch circuits to actual outlet circuits installed at the individual work stations.

In an important embodiment of this invention, the branch circuits, including switches and fuses, and/or circuit breakers plus the branch wiring and outlet receptacles may be part of the prewired modules. The pictorial diagram of FIG. 3 illustrates some advantageous combinations.

In FIG. 3 a module 110 includes heavy gauge service feed wires 118 and 119 connected at one end to connectors 121 and 122 and connector-ready at their other end, as in the embodiment of FIG. 1. To aid in rapid interconnection of modules, the bare wire ends and connections may be identified by labels. In addition, mounted on a first duct cover plate 117 may be, for example, a 120 volt circuit breaker 130 and two 120 volt three-wire outlet receptacles 132. Branch circuit wiring within the duct connects receptacles 132 through circuit breaker 130 to appropriate service wires at connector 122. In a similar fashion, another duct cover plate 136 may have mounted thereon a single phase circuit breaker 138 and a twist lock receptacle 140. Cover plate 136 may also hold a 120/208 volt three-phase circuit breaker 142 and a three phase receptacle 144. Another cover plate 146 may hold still another type branch outlet, such as a circuit breaker 148 and outlet receptacle 150 for another single-phase service. In this manner, the functions of the distribution panel and the branch circuit wiring may also be absorbed, according to the invention, within the prewired module. If modules are chosen that include a mix of most likely-used services, a plant wiring system can be assembled that needs little or no alteration for many years, even though the usual changes in building use continue to occur. Furthermore, the use of unique outlet receptacles, coupled with unique matching electrical equipment connector plugs for each type service, such as described in connection with FIG. 3, provides an important safety keying feature to prevent personal injury and equipment damage. As shown, feeder wires 118 and 119 have a predetermined length such that they protrude from the duct section of module 110 so that they are readily connectable to wire connectors 121 and 122, respectively, of an adjacent similar module 110.

The particular outlet receptacles shown are for illustration purposes only; the invention is, of course, not limited to any particular brand or configuration of receptacles.

Figure 4:
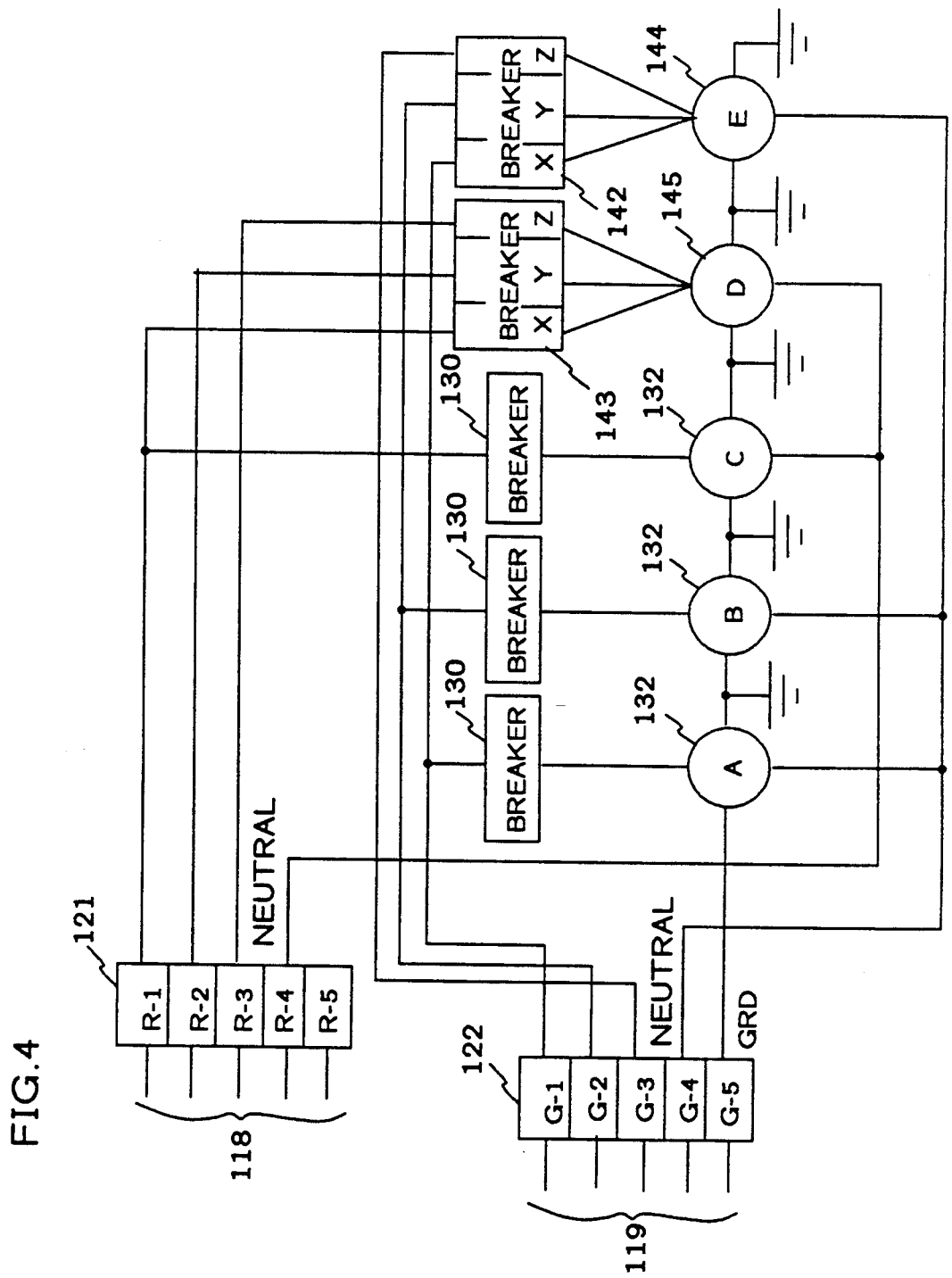

A circuit diagram illustrating one arrangement that may be repeated many times throughout a plant in order to maintain flexibility for unknown future needs is shown in FIG. 4.

The five feeder wires 119, which may ultimately be connected to a 120 volt three-phase unregulated building supply service are connected in a module according to the invention to the individual screw terminals of a connector 122. The individual wires and connector terminals are labeled G1-G5 respectively, with G4 representing the neutral wire and G5 ground. A 120 volt receptacle 132 is connected between feeder wire G1 and neutral G4 via a circuit breaker 130 to form a first branch circuit. A second 120 volt branch circuit may be connected in a similar manner between G2 and G4.

A 120/208 volt three-phase branch circuit for operating heavy machinery is provided via outlet receptacle 144, which is connected to neutral G4 and G1-G3 through breaker 142.

The second four feeder wires 118, which may ultimately be connected to a 120/208 volt three-phase regulated building supply service are connected to the individual screw terminals R1 through R4 of connector 121. A regulated three-phase branch circuit is formed by the connection of three-phase socket to neutral wire R4 and to R1, R2 and R3 through three-phase circuit breaker 143. Regulated 120 volts can be supplied similarly from R1 and R4. In accordance with good practice and electrical codes, all receptacles can be connected to ground.

Figure 5:
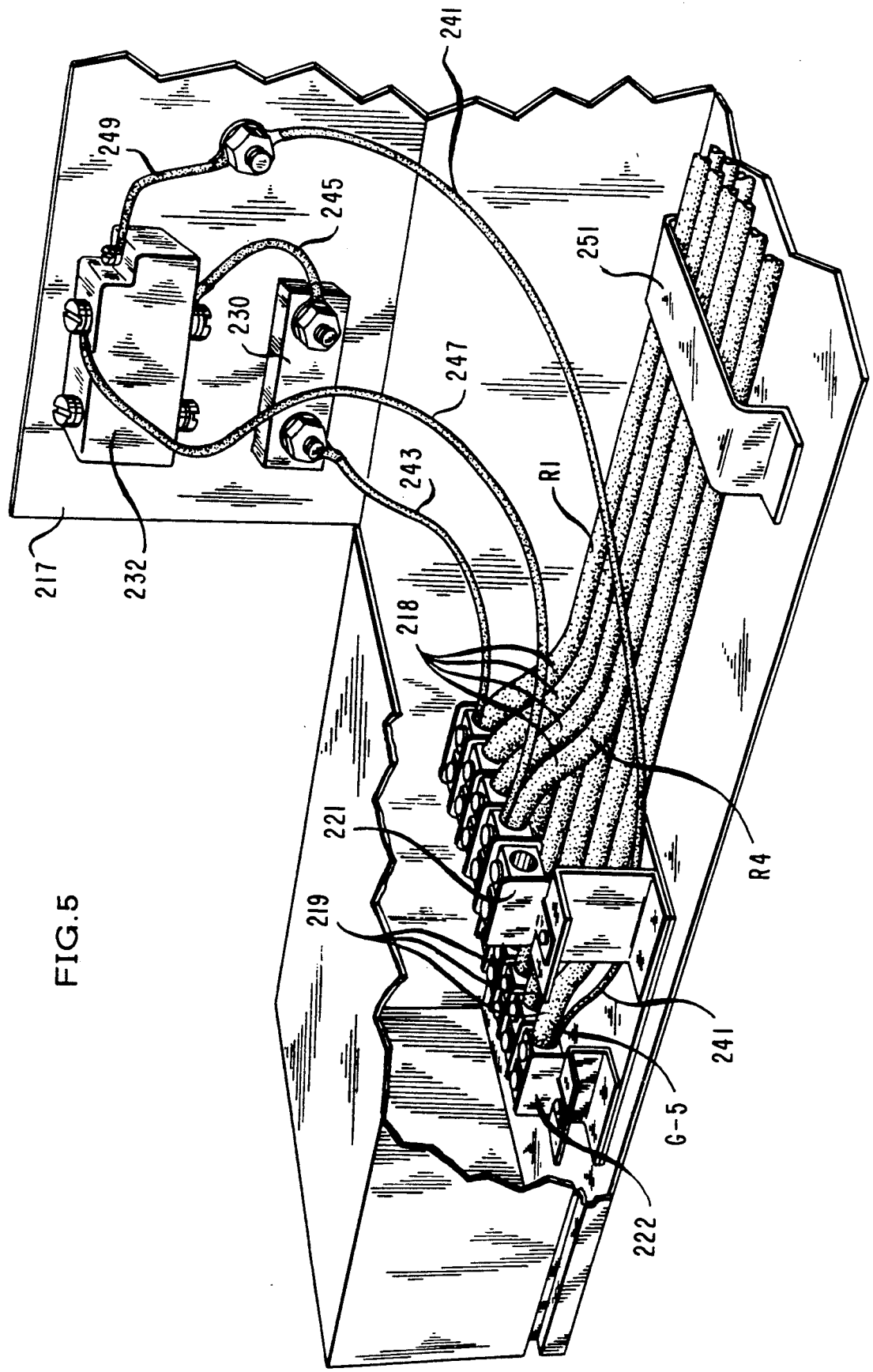
FIG. 5 is a schematic wiring diagram of an embodiment of the invention.

One simple and convenient arrangement for connecting branch circuits is shown in the cut-away view of FIG. 5. In the module shown in FIG. 4, feeder wires 218 and 219 are connected to terminal blocks 221 and 222, respectively. A single phase circuit breaker 230 and a duplex 120 volt receptacle 232 are mounted in a cover section 217. One end of a ground wire 241 is bolted to cover plate 217, and the other end is inserted into the same wire connector in terminal block 222 with G-5 the ground feeder wire from the 219 group of wires. Power may be fed to circuit breaker 230 by a wire 243 inserted into the same wire connector in block 221 that holds R-1, for example. A wire 245 is connected from circuit breaker 230 to the "hot" side of receptacle 232, and a wire 247 from the neutral side of receptacle 232 is inserted into the same connector in block 221 as neutral wire R-4. If receptacle 232 is of a type not grounded through its mounting fasteners, a short ground wire 249 may connect the ground lead to cover plate 217 or ground wire 241. A short ground wire 249 may connect the ground lead on receptacle 232 to cover plate 217 or ground wire 241. Other physical connections that represent good electrical wiring practice can, of course, be made. As an example, a single ground wire from G-5 may be run the length of the module, with taps to each receptacle. Finally, a wire retaining clip 251 may be inserted in the channels of the duct to hold feeder wires 218 and 219 against the duct wall.

It will be obvious to those skilled in the design of electrical service distribution that a mix of modules in which the 120 volt branch circuits derive from different phases of the three-phase feeder lines should be wired to balance the power among the phases according to standard practice. Also, according to standard practice, the size of wire and current ratings of components used in the branch circuits should be chosen to appropriately handle the anticipated load.

Many other supply voltage combinations can be accommodated in modules made according to the invention, depending upon the needs of the business. For example, single phase ac supplies at 110, 220 and 440 volts would be very useful in many installations; even dc may be supplied in this manner. The limitations are really the same that apply to wiring provided in the traditional manner.

We have thus invented and herein described an electrical distribution system made up of modules that can be mass produced efficiently in a variety of configurations. Appropriately selected modules can be mounted and interconnected quickly and easily by semiskilled workers using hand tools to form the system. Should component failures or new requirements dictate, new modules can be quickly substituted for old.

It will be obvious to those skilled in designing or installing electrical service systems that other circuit configurations and other components can be pre-mounted and pre-wired in the modules without departing from the spirit and scope of the invention.

We claim:

1. An electrical service module for interconnection with other similar service modules to provide a continuous electrical service line, said service module comprising:

a section of duct having a first predetermined length;

duct section attaching means for attaching said duct section to a duct section of an adjacent similar module;

feeder wire connecting means rigidly fastened to and positioned within said section of duct, said connecting means including a first plurality of mutually insulated individual wire connectors arranged in a first tier and at least a second plurality of mutually insulated individual wire connectors arranged in a second tier positioned above and horizontally displaced relative to said first tier of wire connectors; and a plurality of insulated electrical feeder wires each having a second predetermined length, each of said feeder wires having one end connected to one of said individual wire connectors and the other end bared of insulation, said second predetermined length being such that said bared ends of said feeder wires protrude from said duct section so that each of said feeder wires is readily connectable to a corresponding wire connector in an adjacent similar module.

2. An electrical service module, as in claim 1, wherein said individual wire connectors each comprise screw clamping means for receiving and clamping one of said bare wire ends of an adjacent module.

3. An electrical service module, as in claim 1, further comprising at least one branch circuit for supplying a branch current, said branch circuit comprising:

at least one outlet receptacle;

overload protection means for interrupting said branch circuit in response to said branch current exceeding a predetermined value; and branch circuit wire connecting said receptacle and said overload protection means in series between two of said individual wire connectors.

4. An electrical service module, as in claim 3, wherein said duct section further comprises a removable cover section; and said overload protection means and said receptacle are mounted in said cover section.

5. An electrical service module, as in claim 4, wherein said plurality of feeder wires comprises five wires for three voltage phases, neutral and ground respectively, and said branch circuit is connected between one of said voltage phase wires and said neutral wire.

6. An electrical service module, as in claim 5, further comprising a three-phase branch circuit for supplying a three-phase current, said three-phase branch circuit comprising:

at least one three-phase outlet receptacle and one three-phase overload protection means, said three-phase outlet receptacle being connected to said neutral wire and in series with said three-phase overload protection means to said respective three voltage phase wires.

* * * * *